United States Patent [19]
Brinkmann et al.

[11] Patent Number: 5,831,764
[45] Date of Patent: Nov. 3, 1998

[54] DRIVE SYSTEM FOR THE MOTION OF A MOVING EQUIPMENT PART

[75] Inventors: Hans Brinkmann, Gottingen; Walter Geis, Aalen, both of Germany

[73] Assignee: Carl-Zeiss-Stiftung, Germany

[21] Appl. No.: 742,062

[22] Filed: Oct. 31, 1996

[30] Foreign Application Priority Data

Nov. 3, 1995 [DE] Germany .................. 195 41 092.0

[51] Int. Cl.⁶ .................. G02B 21/26; F16H 27/02; F16C 19/00
[52] U.S. Cl. .................. 359/392; 359/383; 74/89.17; 74/89.22; 384/56; 384/57
[58] Field of Search .................. 359/382, 383, 359/392; 74/89.17, 89.22; 384/10, 56, 57

[56] References Cited

U.S. PATENT DOCUMENTS

| | | | |
|---|---|---|---|
| 3,790,233 | 2/1974 | Polidor | 384/56 |
| 3,895,770 | 7/1975 | Yoshida et al. | 359/392 |
| 4,090,069 | 5/1978 | Lisfeld et al. | |
| 4,575,199 | 3/1986 | Lisfeld | 359/392 |
| 4,653,878 | 3/1987 | Nakasata et al. | |
| 4,684,225 | 8/1987 | Clark et al. | 350/518 |
| 4,704,013 | 11/1987 | Clark | 359/392 |
| 4,923,311 | 5/1990 | Gibbs | 384/49 |
| 4,948,330 | 8/1990 | Nomura et al. | 414/749 |
| 5,161,424 | 11/1992 | Saberton et al. | 74/89.17 |
| 5,247,823 | 9/1993 | Rossi | 72/279 |
| 5,374,128 | 12/1994 | Herbeck | 384/49 |

FOREIGN PATENT DOCUMENTS

| | | |
|---|---|---|
| 2627486 | of 0000 | Germany . |
| 805794 | 12/1958 | United Kingdom . |
| 1012974 | 12/1965 | United Kingdom . |

*Primary Examiner*—Jon W. Henry

[57] ABSTRACT

A drive system for the conversion of a rotary motion into a linear motion contains a belt drive similar to a block and pulley system, and a system of a rack and pinion that is driven synchronously with the belt drive. The pinion and the rack are adjusted with respect to each other such that the teeth of the pinion engage with relatively large play in the rack. When driving under normal load, the drive takes place without loading of the rack and pinion system by the belt drive, so that the reversal backlash and the play of the rack and pinion system remain without effect on the displacement motion. When an overloading of the moving part and a corresponding stretching of the drive belt occur, the tooth flanks of the pinion and of the rack are supported against each other and in this manner prevent tearing or overloading of the drive belt. The drive system has a high reproducibility and a small reversal back-lash, and is particularly applicable for the drive of the focusing motion in microscopes with automatic repositioning by means of a drive motor.

10 Claims, 3 Drawing Sheets

DRIVE SYSTEM FOR THE MOTION OF A MOVING EQUIPMENT PART

BACKGROUND OF THE INVENTION

1. Field of the Invention

This invention relates to a drive system for the motion of moving equipment parts and more particularly to a drive system for motion of microscope stages.

2. Discussion of Prior Art

The driving of parts which move relative to each other in optical instruments, in particular the conversion of a rotary motion on a primary side into a linear motion on the secondary side, usually takes place by means of a mutually engaged rack and pinion system or by a system of a threaded spindle and a threaded nut.

A drive of the first type for the focusing movement in a microscope is described, for example, in German Laid-Open Patent Application A1-26 27 486. Due to the play, which is unavoidably present, of the rack and pinion system, such drive systems have a marked reversal backlash. Moreover, the attainable position accuracy is determined by the surface quality of the mutually engaged tooth flanks. The reversal backlash is particularly disadvantageous in systems which, by means of a motor drive with a corresponding motor control, make possible an automatic repositioning into a previously stored setting, as described, for example, in German Laid-Open Patent Application A1-34 10 201, or movement over path lengths predetermined by the rotational angle of the motor, for example, in automatic travel to a new focus position with high reproducibility after a change of objective. A cause of this is that the rotational movement of the drive motor required for a given linear movement depends on whether a reversal of direction takes place relative to the previous movement, or whether the movement occurs in the direction of gravity or against it.

An adjusting table which is displaceable in three spatial directions and has motor drives is described in U.S. Pat. No. 5 4,948,330, in which a harmonic drive gearing is provided between the drive motor and the drive spindle for gearing down the motor movement. Harmonic drive gears are characterized in that the number of moving parts is minimal, and hence the reversal backlash of the gearing can likewise be minimized. The conversion of the geared-down rotation into the linear movement takes place in the described system, however, by means of a system of the second type, comprising a threaded spindle and threaded nut, which is comparable as regards reversal backlash with the rack and pinion system described herein above. Thus the small reversal backlash of the harmonic drive gearing is outweighed by the relatively large reversal backlash of the spindle drive.

It has been proposed in British Patent 1,012,974 and U.S. Pat. No. 4,684,225 to provide a belt drive for the conversion of a rotary motion into the linear movement of the stage of a microscope. Such belt drives in fact show no, or very small, reversal backlash; however, they do not have the necessary strength when the stage is overloaded. In particular, strong impulses, which arise on setting a heavy object on the stage, or if the microscope user inadvertently leans on the stage, can lead to breakage of the drive belt. Although they have been known for a long time, such belt drives have heretofore not been utilized for the focusing movement in microscopes.

SUMMARY OF THE INVENTION

The object of the invention is therefore to provide a drive system which makes possible a nearly play-free motion conversion of a rotary motion into a translational movement, and at the same time has high strength against large loads impressed from the exterior on the moving parts.

This object is attained according to the invention in which the moving equipment part and the stationary equipment part are coupled together by means of a belt drive driven by a drive roller and by means of a rack and pinion system driven synchronously with the belt drive.

The drive system according to the invention has a combination of a belt drive and a rack and pinion system driven synchronously with the belt drive. The pinion then engages with play in the teeth of the rack. The play of the rack and pinion system is designed in relation to the permissible loads of the driven part and the tensile strength of the drive belt so that, for all permissible loads, a distinct play is present between the pinion and the rack. The conversion of the rotary motion into a linear motion thereby takes place exclusively, at all permissible loads, by means of the belt drive and therefore has a small reversal backlash and a high reproducibility. At the permissible loads, the rack and pinion system runs without loading. It is only when the permissible loading is exceeded and a greater stretching of the drive belt results that the tooth flanks of the pinion and the rack are supported against each other and thus prevent excessive stretching and resultant damage of the belt.

It should be noted in this connection that no high requirements are placed on the precision and surface quality of the rack and pinion in the drive system according to the invention, since the precision of these components has no effect on the precision of the drive system, and these components come into operation only as an overload protection.

The belt drive can be constructed in a simple manner in the form of a block and pulley. The ratio of the diameter of the pinion and the diameter of the driven roller of the belt drive must then correspond to the transmission ratio of the block and pulley. A corresponding number of rotatably mounted rollers, according to the desired transmission ratio, are then provided for the belt drive on the moving part. As the simplest example of a block and pulley, only a single rotatable roller is arranged on the moving part, and is suspended in the tensioned belt according to the principle of a loose roller. In such a system, the diameter of the pinion is then half as large as the diameter of the drive roller of the belt drive.

In a further preferred embodiment, the pinion and the drive roller for the belt drive are arranged on a common drive shaft, which is rotatably mounted in the stationary part of the equipment, and the rack is arranged on the moving part. Additional bearings for the pinion are thus avoided.

The pretensioning of the belt can be produced, according to the planned direction of motion, either by the weight of the moving part or by a spring between the moving part and the stationary part. If the weight of the moving part itself is only small, a combined tensioning by gravity and spring force can also be applied.

The drive system preferably has a drive motor and a harmonic drive gearing between the drive motor and the drive roller of the belt drive. Due to the small reversal backlash of the belt drive, the low reversal backlash of the harmonic drive gearing is then also fully made use of in such a combination. Moreover, the relatively large gear ratio of the harmonic drive gearing compensates for the relatively small transmission ratio of the belt drive, so that a large overall transmission ratio results. With such a system, highly precise positioning or displacements by predetermined path lengths are then possible by the movement of the motor through a predetermined angle of rotation.

The drive system according to the invention is particularly suitable for the transmission of the focusing motion to a stage in microscopes.

The drive system according to the invention is furthermore preferably utilized in combination with a linear guide system with double guides on both sides. Such double guides on both sides have a high stability and rigidity in comparison with single guides on both sides. To avoid the over determination which arises with double guides, a portion of the guide surfaces is to be formed by the flat surfaces of rotatable beveled round rods, which are inserted into openings of the guided part or of the stationary part. A wedge angle between the portions of the linear guide system is compensated by the rotatability of the round rods. By the cooperation of the nearly play-free drive system with the high rigidity of the linear guide system constructed with double guides on both sides, the precision of the drive is fully transmitted to the motion of the guided part.

BRIEF DESCRIPTION OF THE DRAWINGS

Details of the invention are explained herein below, with reference to the preferred embodiments shown in the accompanying drawings, in which.

DETAILED DESCRIPTION OF PREFERRED EMBODIMENTS

Figure 1:
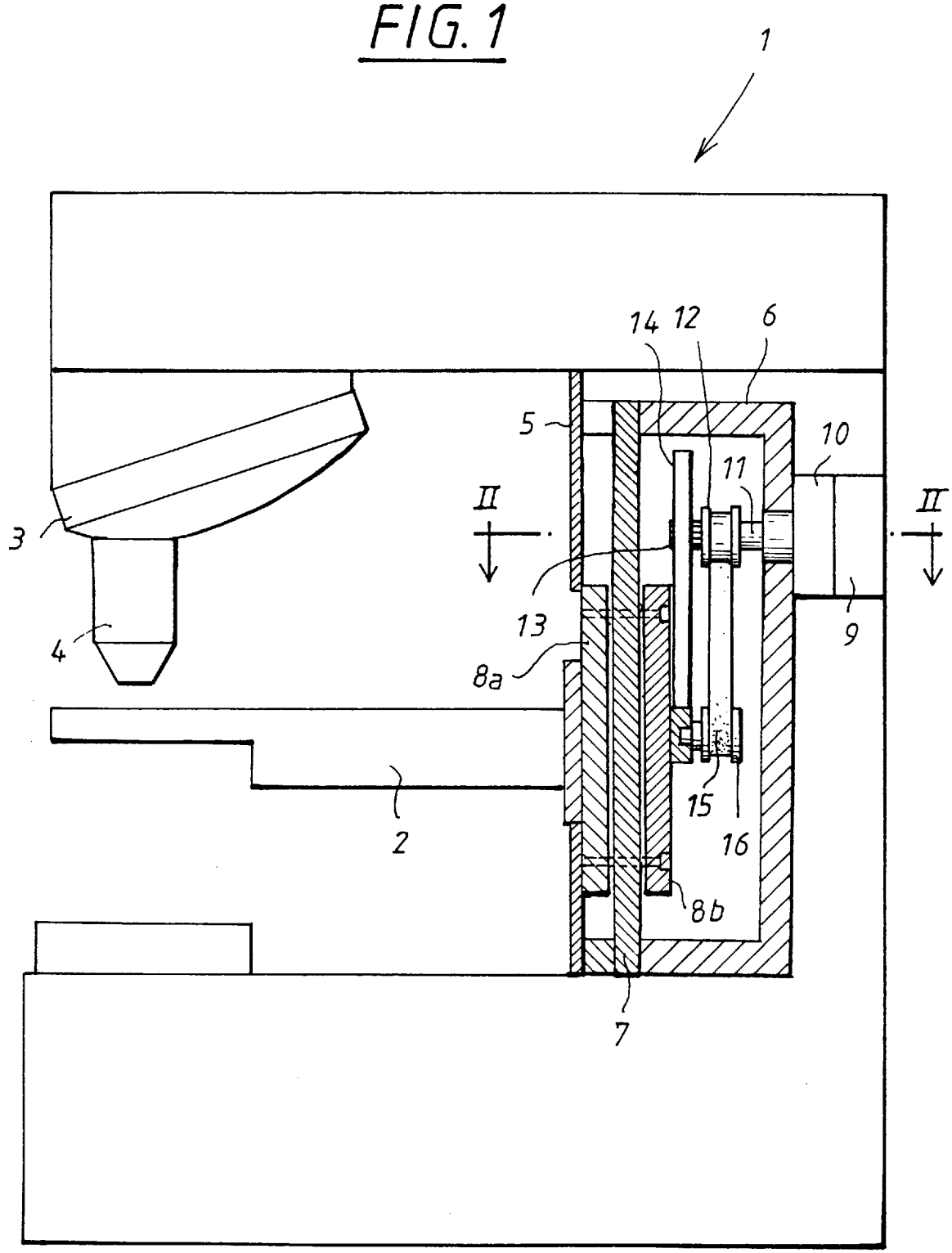
FIG. 1 shows, in a vertical section, the lower portion of a microscope, with a drive system according to the invention for the focusing motion of the stage.

The lower portion of the microscope stand is denoted by (1) in FIG. 1. The stage (2) is received on a vertical column (5) of the microscope stand (1), on a drive module (6) within the vertical column (5). By means of the drive module (6), the stage (2) is displaceable for focusing, in a vertical direction relative to the objective (4) received in a revolving nosepiece (3).

For the precise guiding of the stage (2) in the vertical direction, the focusing module (6) has double linear guides on both sides, with a fixed guide plate (7) and two plates (8a, 8b) which are guided in a vertical direction. The stage (2) is connected to the guided plates (8a, 8b).

An electric motor (9) is provided to produce the focusing motions, and can be controlled by a motor control (not shown in the drawing) such that the shaft of the electric motor (9) executes angular motions through an angle of rotation which is defined by the motor control. For this purpose, the electric motor (9) has an angle encoder. Since such motors and the associated motor controls are well known, there is no need to go further into the details of them here.

The rotary motion of the electric motor (9) is geared down by a subsequent harmonic drive gearing. This harmonic drive gearing has the known structure of an elliptical steel disc with a central hub, and an attached, elliptically deformable thin ring ball bearing which is coupled to the shaft of the motor (9); a rigid cylindrical ring with inner toothing as the outer component; and, between the elliptical steel disc and the cylindrical ring, a cylindrical steel bushing with outer toothing. On a rotary motion of the elliptical steel disc, the cylindrical steel bushing, whose outer toothing is in engagement with the inner toothing of the cylindrical ring in the direction of the major axis of the ellipse, is deformed by means of the elliptically deformable ball bearing. The major elliptical axis of the cylindrical steel bushing is displaced by means of this deformation. Since the cylindrical steel bushing has two fewer teeth than the cylindrical ring, there results a relative motion between the cylindrical steel bushing and the cylindrical ring to the extent of two teeth after one revolution of the elliptical steel disc. The cylindrical steel bushing therefore executes a strongly geared down motion and serves as the driven element of the gearing.

A drive roller (12) for the belt drive and a pinion (13) are arranged coaxially of each other on the driven shaft (11) of the harmonic drive gearing (10); the diameter of the pinion (13) amounts to half of the diameter of the drive roller (12). The pinion is in engagement, with play, with a rack (14), which is fastened to the guided plate (8b) of the linear guide.

In the lower region of the rack (14), a further roller (16) is rotatably fastened to the guided plate (8b) of the linear guide by means of a ball bearing, which is not shown in detail. This roller (16) is suspended on the linear guide, as can be gathered from FIG. 4, in a U-shaped loop of a flat steel band (15), which is attached to the drive roller (12). The second end of the steel band (15) is attached at about the same height as the drive roller (12) to a fixed shaft (17) on the focusing module (6).

The belt drive, consisting of the fixed shaft (17), the rotatable roller (12) on the stationary part, and the likewise rotatable roller (16) on the moving part, operates according to the principle of a loose roller. Upon one rotation of the drive roller (12) in the clockwise direction, the loose roller (16) is lifted by a distance which corresponds to half of the peripheral motion of the drive roller (12). Since the diameter of the pinion is half the diameter of the drive roller (12), the system of rack (14) and pinion (13) is moved, neglecting the thickness of the drive band (15), synchronously with the motion of the belt drive and thus of the driven part (8b). The preset play between the teeth of the pinion (13) and the teeth of the rack (14) is hence maintained during the motion. A loading of the system of rack and pinion only arises when the stage (2) (FIG. 1) is loaded more strongly than permissible and the band (15) is thereby correspondingly strongly extended. The precision of the transmission of motion, particularly with regard to freedom from play and to reversal backlash, is thus determined simply and solely by the belt drive. The rack (14) and pinion (13) system serves solely to protect the belt drive when excessive loading occurs. It is of definitive importance here that the precision of the tooth elements, in particular their surface quality, does not decisively participate in the positioning, and that at the same time a long life of the drive is ensured by the protection of the belt drive.

Figure 4:
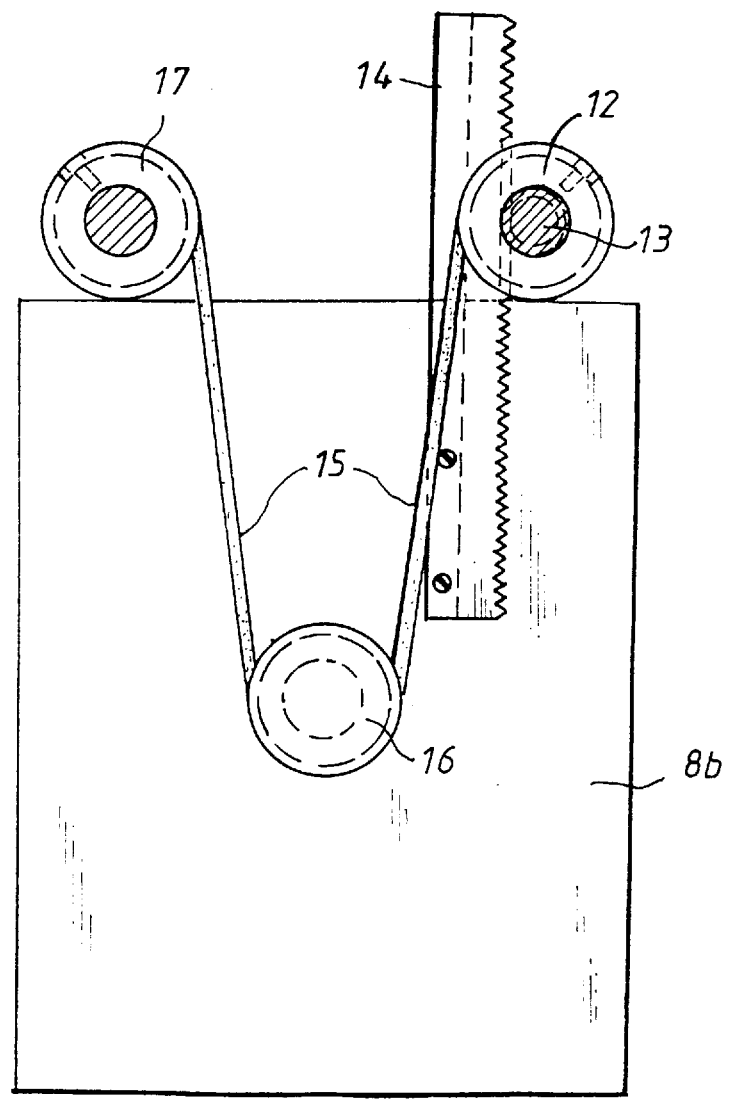
FIG. 4 shows a section in the vertical direction through the drive system in FIG. 2, along the plane IV—IV.

In the preferred embodiment shown in FIGS. 1 and 4, the belt drive is pretensioned exclusively by the weight of the stage (2) and the linear guide. If the weight of the stage (2) is not sufficient for the tensioning of the belt drive, a tensioning spring can be additionally provided, which pulls or presses the moving parts of the linear guide (8a, 8b) against the tension direction of the band (15).

Figure 2:
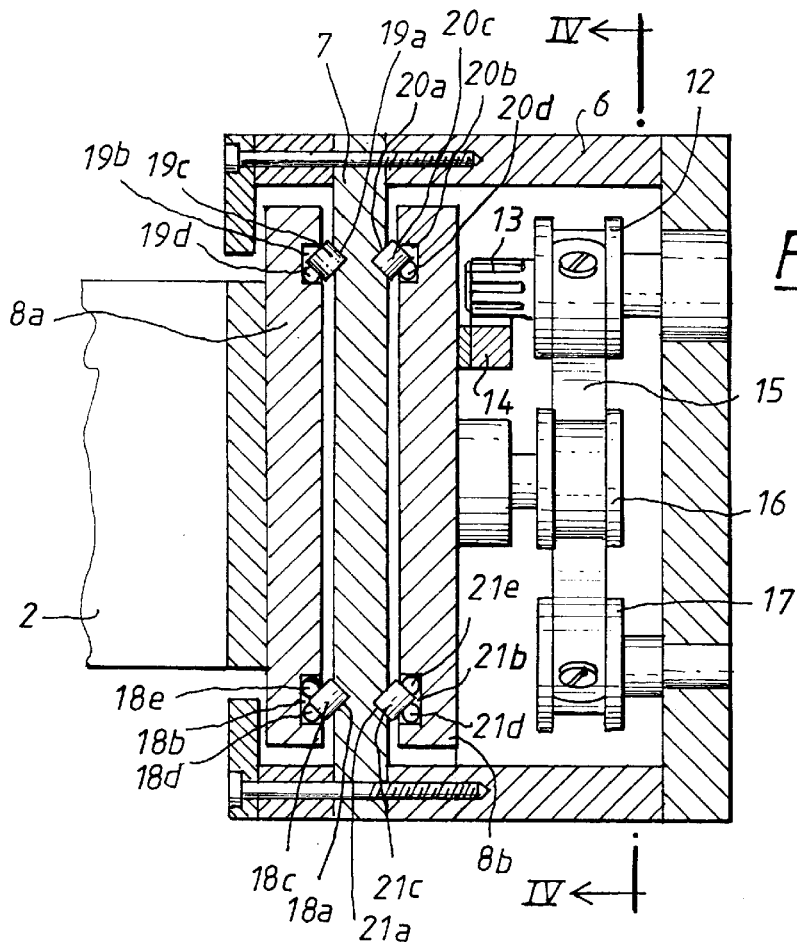
FIG. 2 shows a horizontal section through the drive system along the plane II—II in FIG. 1.
Figure 3:
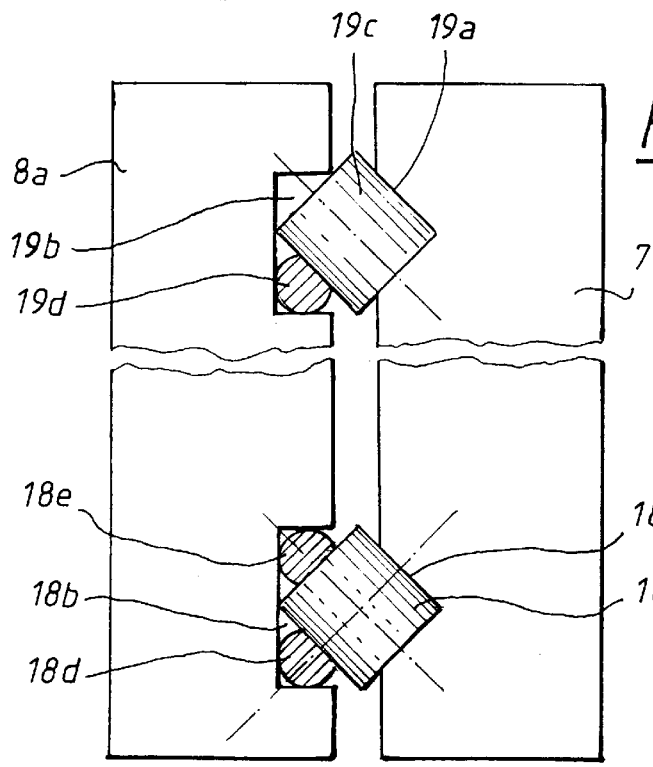
FIG. 3 shows an enlarged section of the linear guide in FIG. 2 with rotatable, beveled round rods in guide grooves.

Enlarged details of the linear guide are shown in the sectional views of FIGS. 2 and 3. The linear guide is a sandwich construction of three plates (8a, 7, 8b). The middle plate (7) is screwed to the frame of the focusing module (6). The stage (2) is received on the outer plate (8a) on the stage side, and the rack (14) and the loose roller (16) are received on the plate (8b) on the drive side. The two outer plates (8a, 8b) are connected together by the screws shown in FIG. 1 which engage through slotted holes in the middle plate (7).

The middle plate (7) has, in the direction of motion, on its two opposite surfaces, respectively two parallel grooves (18a, 19a, 20a, 21a) which run perpendicularly to the plane of the drawing in FIG. 2. The two outer plates (8a, 8b) respectively have, on the side facing the middle plate (7), two grooves (18b, 19b, 20b, 21b) which run parallel, have rectangular cross sections, and likewise run parallel to the V-shaped grooves (18a, 19a, 20a, 21a) of the middle plate (7), and have spacings which match the spacings of the V-shaped grooves. This double guide on both sides thus has a total of four guide ways, which are respectively formed by a V-shaped groove in the middle plate 7 and the opposed rectangular groove of the outer plate (8a, 8b). Rolling bodies in the form of rollers (18c, 19c, 20c, 21c) or balls are inserted in these guide ways. Moreover, the beveled round rods (18d, 18e, 19d, 20d, 21d, 21e) are rotatably inserted with the flat surfaces facing the rolling bodies (18c–21c). The flat surfaces of these beveled round rods form the guide ways for the rolling bodies.

Two beveled round rods are thus inserted in two mutually opposite rectangular grooves (18d, 21d), and the rollers (18c, 21c) are inserted crosswire in the V-shaped guide grooves (18a, 21a). In the spaced-apart other side, respectively only one round rod (19d, 20d) is inserted in the mutually opposed rectangular grooves, and the rollers are all aligned in the same direction. This insertion of the rollers in the like direction in the one guide groove (19a, 19b) and the crosswise insertion of the rollers in the other guide groove (18a, 18b) is indicated in the enlarged view of FIG. 3 by the axes of rotation, shown dashed, of the rolling bodies.

Because the beveled round rods are rotatable in their seats formed by the corners of the rectangular grooves, wedge angles between the plates (8a and 7, or 7 and 8b) are compensated. Over-determinations, which otherwise arise with double guides on both sides, are thereby prevented. It is thus only important, in technical production, to ensure the mutual parallelism of the grooves (18a–21a, 18b–21b) in the three plates (8a, 7, 8b). As regards the spacings of the grooves (18a–21a, 18b–21b), on the other hand, no requirements of high accuracy have to be set, since any errors are compensated by the rotation of the round rods. The matching alignment of the beveled round rods in their seats is adjusted of itself on screwing together and tightening the screws which connect the two outer plates (8a, 8b).

Such a linear guide with double guides on both sides is distinguished by high stability and rigidity, so that hardly any tilting moments arise which could be transmitted to the stage. At the same time, a high degree of smooth running is ensured, since no overdetermination can lead to jamming. Thus the motion of the stage (2) can take place with the high precision which is ensured by the belt drive.

The belt drive is constructed on the principle of a loose roller in the preferred embodiments shown in the Figures. This belt drive provides a transmission ratio of 1:2 between the motion of the driven part (8b) and the peripheral motion of the driving roller (12). Alternatively, it is also possible to make use of other belt drives of the block and pulley type. For example, the shaft (17) could be rotatably mounted, the band (15) guided by means of a second roller on the moving part, and attached at the focusing module again at the height of the shaft (17). Such a block and pulley system then provides a transmission ratio of 1:4. In this case, the pinion (13) is to be made with a diameter which corresponds to one quarter of the diameter of the drive roller (12).

We claim:

1. A drive system for driving a first equipment part relative to a second equipment part, comprising:

a drive roller and a pinion rotatably journaled to said first equipment part, wherein said pinion is mechanically coupled to said drive roller providing a synchronous rotation of said drive roller and said pinion, a belt having a first end and a second end, said first end being fixed to said drive roller in a manner that said belt winds up upon said drive roller on rotation of said drive roller, said second end of said belt being connected to said second equipment part providing a relative movement between said first and second equipment parts when said belt winds up upon said drive roller, and a rack having teeth mounted to said second equipment part, wherein said pinion engages with play in said teeth of said rack.

2. The drive system according to claim 1, wherein said second end of said belt is attached to said first equipment part in a manner providing a U-shaped loop of said belt, a second roller is rotatably journaled to said second equipment part, and said second roller is suspended in said U-shaped loop of said belt for connecting said belt to said second equipment part.

3. The drive system according to claim 2, wherein said second equipment part is a moving equipment part.

4. The drive system according to claim 2, wherein said belt and said second roller form a block and pulley system, and the ratio of the diameters of said pinion and said drive roller corresponds to the transmission ratio of said block and pulley system.

5. The drive system according to claim 4, wherein said second roller is suspended in said u-shaped loop so that one rotation of said drive roller lifts said second roller by a distance that corresponds to half of the peripheral movement of said drive roller, and the diameter of said pinion is half as large as the diameter of said drive roller.

6. The drive system according to claim 4, wherein the belt of said belt drive is tensioned by the weight of said second equipment part.

7. The drive system according to claim 1, wherein a drive motor and said drive roller are coupled together by a harmonic drive gearing.

8. A microscope with a drive system according to claim 1, wherein said second equipment part comprises a stage of said microscope.

9. A microscope with a drive system according to claim 1, wherein said second equipment part is guided by linear guides on said first equipment part and a portion of guide surfaces of said linear guides comprise flat surfaces of rotatable beveled round rods located in recesses of said linear guides.

10. A drive system for driving a moving equipment part relative to a stationary equipment part, in which said moving equipment part and said stationary equipment part are coupled together by a drive belt driven by a drive roller and by a rack and pinion system driven synchronously with said drive belt, said moving equipment part is guided by linear guides on said stationary equipment part, and a portion of guide surfaces of said linear guides are flat surfaces of rotatable beveled round rods located in recesses of said linear guides, two rotatable beveled rods being positioned in each of two mutually opposed rectangular grooves and a single rotatable beveled rod being positioned in each of two other mutually opposed rectangular grooves.

* * * * *